United States Patent [19]

Bäbler

[11] Patent Number: 4,632,704
[45] Date of Patent: Dec. 30, 1986

[54] PROCESS FOR THE PREPARATION OF HIGH YIELD PIGMENTS

[75] Inventor: Fridolin Bäbler, Marly, Switzerland

[73] Assignee: Ciba-Geigy Corporation, Ardsley, N.Y.

[21] Appl. No.: 825,292

[22] Filed: Feb. 3, 1985

[30] Foreign Application Priority Data

Feb. 6, 1985 [CH] Switzerland ............... 524/85

[51] Int. Cl.$^4$ .................................... C04B 14/00
[52] U.S. Cl. ........................ 106/288 Q; 106/309
[58] Field of Search .................. 106/288 Q, 309

[56] References Cited

U.S. PATENT DOCUMENTS

| | | | |
|---|---|---|---|
| 4,017,496 | 4/1977 | Hanke | 106/288 Q |
| 4,064,129 | 12/1977 | Gerson et al. | 106/288 Q |
| 4,100,162 | 7/1978 | North | 106/288 Q |
| 4,165,319 | 8/1979 | von der Crone et al. | 106/288 Q |
| 4,247,695 | 1/1981 | Fitzgerald | 106/288 Q |
| 4,262,120 | 4/1981 | von der Crone et al. | 106/288 Q |
| 4,271,301 | 6/1981 | Lotsch et al. | 106/288 Q |
| 4,311,527 | 1/1982 | Lotsch | 106/288 Q |
| 4,385,174 | 5/1983 | Iqbal et al. | 548/471 |
| 4,500,718 | 2/1985 | Rochat et al. | 548/455 |
| 4,579,949 | 4/1986 | Rochat et al. | 546/167 |

FOREIGN PATENT DOCUMENTS 94911 11/1983 European Pat. Off.

*Primary Examiner*—Prince E. Willis
*Assistant Examiner*—Willie J. Thompson
*Attorney, Agent, or Firm*—Luther A. R. Hall

[57] ABSTRACT

A process for the preparation of high yield pigments of the series of the diketopyrrolopyrroles, quinacridones, isoindolinones and isoindolines by protolysis of the pigment salt obtained by treating the crude pigment with a strong base or of the pigment salt obtained in the course of the synthesis, which process comprises treating said pigment salt, in an organic solvent, with water such that the organic solvent is simultaneously removed during the protolysis. The pigments so obtained are high yield pigments and have a particularly fine crystalline form and excellent purity.

9 Claims, No Drawings

PROCESS FOR THE PREPARATION OF HIGH YIELD PIGMENTS

It is known that conditioned pigment forms are obtained by protolysis of salts of pigments of the series of the diketopyrrolopyrroles, quinacridones, isoindolinones and isoindolines.

The present invention relates to a process for the preparation of high yield pigments of the series of the diketopyrrolopyrroles, quinacridones, isoindolinones and isoindolines by protolysis of the pigment salt obtained by treating the crude pigment with a strong base or of the pigment salt obtained in the course of the synthesis, which process comprises treating said pigment salt, in an organic solvent, with water such that the organic solvent is simultaneously removed during the protolysis.

The process of this invention is particularly suitable for the diketopyrrolopyrrole pigments obtained e.g. by the process described in European published patent specification EP-A No. 94 911 and also for mixtures thereof with each other or with quinacridones or other pigments.

In many cases the pigments to be treated are obtained in the final stage of the synthesis direct as alkali salts. Alternatively, they can be converted into the salts by subsequently treating the pigment or pigment mixture with a strong base, for example an alkali metal hydroxide or alcoholate, or also with ammonia or an alkylamine, for example methylamine or ethylamine, in a polar organic solvent.

Examples of suitable organic solvents are in particular polar organic solvents, e.g. amides such as dimethylformamide, dimethylacetamide or tetramethylurea; nitriles such as acetonitrile; ketones such as acetone, methyl ethyl ketone and cyclohexanone; ethers such as glycol ethers; and, in particular, alcohols such as methanol, ethanol, propanol, butanol, pentanol, hexanol or heptanol and, preferably, tert-amyl alcohol, as well as mixtures of the above alcohols. Examples of suitable non-polar solvents are aromatic hydrocarbons such as benzene, toluene, xylene and chlorinated aliphatic hydrocarbons or petroleum fractions.

The pigment salt can be present in the organic solvent in dissolved, partially dissolved or undissolved form.

The water used for the protolysis may additionally contain inorganic or organic acids such as hydrochloric acid, sulfuric acid, phosphoric acid, carbonic acid, formic acid, acetic acid, oxalic acid or p-toluenesulfonic acid. However, it is preferred to use water only. The protolysis is conveniently carried out in the temperature range from 15° to 100° C., preferably above 95° C.

The removal of the solvent is effected directly during the protolysis. The removal may be carried out under pressure or, preferably, by introducing steam. The simultaneous removal of the solvent by distillation during the protolysis substantially prevents the growth of the pigment crystals so that particularly fine crystalline and correspondingly high yield pigments are obtained. In certain cases the protolysis may be coupled with a conversion of the crystal modification.

The resultant pigments can be isolated from the reaction mixture by filtration. Soluble alkaline or acid impurities originating from the synthesis can be separated from the pigment in dissolved form in the course of the filtration in ideal manner by adjusting the pH of the aqueous pigment suspension obtained after the protolysis. Productive and particularly pure pigments having high saturation are thus obtained. It is surprising that, at protolysis temperatures of over 90° C., pigments can be obtained in such fine crystalline form.

The pigments obtained by the process of this invention usually have excellent dispersing properties when incorporated in plastics and varnishes. The addition of auxiliaries, for example dispersants such as polyglycol ethers, fatty acids, colophonium soap, adducts of alkylene oxides, especially of ethylene oxide with fatty acids, or alkylammonium compounds such as alkylammonium polyglycol ethers, can have a further favourable conditioning effect. The auxiliaries can be added to the polar organic solvent or to the water before the protolysis, or to the aqueous pigment suspension after the protolysis.

A further advantage of the process of this invention resides in the possibility of processing the resultant fine crystalline pigments direct to pigment preparations, without further mechanical comminution, starting from the filter cake, e.g. by the flush process.

The pigments obtained by the process of this invention are suitable for all pigment applications and are distinguished by excellent colour strength and transparency, good fastness to light, weathering and heat, excellent purity and saturation, as well as by good dispersibility when incorporated into plastics and varnishes.

EXAMPLE 1

A 750 ml glass flask is charged with 180 ml of tert-amyl alcohol and nitrogen is slowly blown in. 10.4 g of sodium and then 0.2 g of the sodium salt of bis-2-ethylhexylsulfosuccinate as emulsifier are added to the tert-amyl alcohol and the mixture is slowly heated to 95°–102° C. With efficient stirring, the metal is dissolved in the alcohol. The resultant solution is cooled to c. 90° C. and then 41.2 g of p-chlorobenzonitrile are added. The mixture is heated to 110° C. and, while blanketing with nitrogen and with stirring, 30.4 g of diisopropyl succinate are added dropwise over 2½ hours. The reaction mixture is kept for 2 hours at 100°–105° C. and the suspension of the pigment salt is poured into water at 90° C. while simultaneously introducing steam and distilling off the solvent. The aqueous pigment suspension is filtered and the filter cake is washed with hot water until neutral and dried at 80° C. in a vacuum drying cabinet. The pigment is comminuted, affording 38 g of a red pigment powder of the formula

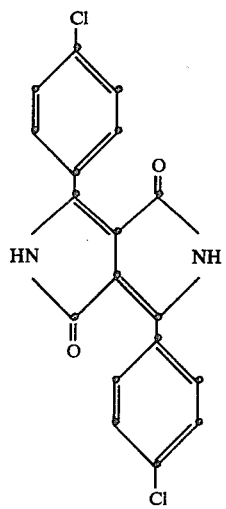

which colours soft PVC sheets in transparent and very strong red shades of great purity and high saturation.

EXAMPLE 2

A 1500 ml glass flask is charged with 500 ml of tert-amyl alcohol and nitrogen is slowly blown in. 27.6 g of sodium and then 0.4 g of the sodium salt of bis-2-ethyl-hexylsulfosuccinate as emulsifier are added to the tert-amyl alcohol and the mixture is slowly heated to 95°–102° C. With efficient stirring, the fused metal is dissolved in the alcohol. The resultant solution is cooled to 80° C. and 81.6 g of benzonitrile and 1.1 g of p-chlorobenzonitrile are added. The mixture is heated to 110° C. and, while blanketing with nitrogen and with stirring, 80.8 g of diisopropyl succinate are slowly added dropwise over 3 hours. The isopropanol which forms during the addition is simultaneously distilled off. Towards the end of the reaction the temperature falls to 104° C. The suspension of the pigment salt is allowed to react for 2 hours while simultaneously distilling off some of the solvent. The reaction mixture is then cooled to room temperature. 550 g of water are put into a 2500 ml glass flask and heated to 95° C. While blanketing with nitrogen, introducing steam and simultaneously distilling off the organic solvent, the suspension of the pigment salt is added dropwise to the water and the pigment salt is protolysed to the pigment. The aqueous pigment suspension is further stirred for half an hour and then filtered hot. The filter cake is washed with hot water until neutral and then dried at 80° C. in a vacuum drying cabinet and comminuted, affording 70 g of a red pigment powder which colours PVC in transparent shades.

EXAMPLE 3

The procedure of Example 1 is repeated, except that the suspension of the pigment salt is poured into water at 40°–50° C. under reduced pressure while simultaneously distilling off the organic solvent. The red pigment powder so obtained colours varnishes and plastics in transparent, strong shades.

EXAMPLE 4

A 1500 ml glass flask is charged with 300 ml of tert-amyl alcohol and nitrogen is slowly blown in. 2.5 g of sodium and then 0.2 g of the sodium salt of bis-2-ethyl-hexylsulfosuccinate as emulsifier are added to the tert-amyl alcohol and the mixture is slowly heated to 95°–102° C. With efficient stirring, the fused metal is dissolved in the alcohol. The resultant solution is cooled to 80°–90° C. and then 26.7 g of crude isoindoline pigment of the formula

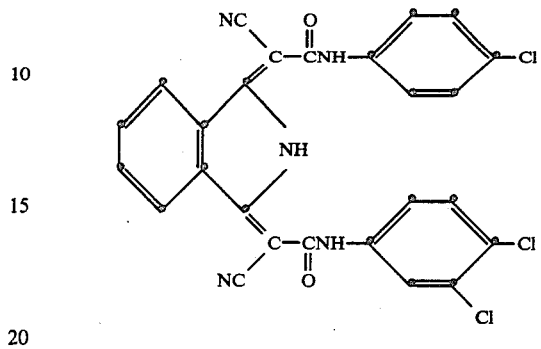

are added. The mixture is stirred for 3 hours at reflux temperature and the pigment salt forms. The reaction mixture is then cooled to room temperature.

300 g of water are put into a 2500 ml glass flask and heated to reflux temperature. The suspension of the pigment salt is added dropwise to the water at 95° C. while simultaneously introducing steam and distilling off the organic solvent, whereupon the pigment precipitates.

The pigment suspension is stirred for 30 minutes and filtered hot. The filter cake is washed with hot water until neutral, dried at 80° C. in a vacuum drying cabinet and comminuted, affording 24 g of an orange pigment which colours alkyd/melamine stoving varnishes in substantially stronger and more transparent shades than the starting pigment.

EXAMPLE 5

The procedure of Example 4 is repeated, using 32.1 g of crude C.I. Pigment Yellow 110 instead of 26.7 g of isoindoline pigment to give 30 g of a yellow pigment powder which, compared with the crude pigment, gives substantially stronger, more transparent and more greenish colourations when incorporated in varnishes and plastics.

EXAMPLE 6

The procedure of Example 5 is repeated, using methanol as solvent instead of tert-amyl alcohol. A pigment of comparably good properties is obtained.

EXAMPLE 7

The procedure of Example 6 is repeated, using 4.5 g of sodium hydroxide instead of 2.5 g of sodium. A pigment of comparably good properties is obtained.

EXAMPLE 8

The procedure of Example 5 is repeated, using isopropanol as solvent instead of tert-amyl alcohol. A yellow pigment of comparably good properties is obtained.

EXAMPLE 9

The procedure of Example 5 is repeated, using ethylene glycol monomethyl ether as solvent instead of tert-amyl alcohol. A yellow pigment of comparably good properties is obtained.

EXAMPLE 10

The procedure of Example 5 is repeated, using toluene as solvent instead of tert-amyl alcohol. A yellow pigment of comparably good properties is obtained.

EXAMPLE 11

The procedure of Example 6 is repeated, using 7.5 g of potassium methylate instead of 2.5 g of sodium. A yellow pigment of comparably good properties is obtained.

EXAMPLE 12

The procedure of Example 11 is repeated, except that the suspension of the pigment salt is added dropwise to 300 g of dilute hydrochloric acid instead of water. A yellow pigment of comparably good properties is obtained.

EXAMPLE 13

The procedure of Example 12 is repeated, except that the suspension of the pigment salt is added dropwise to 300 g of 80% aqueous acetic acid instead of dilute hydrochloric acid. A yellow pigment of comparably good properties is obtained.

EXAMPLE 14

A 750 ml glass flask is charged with 300 ml of tert-amyl alcohol and nitrogen is slowly blown in. 6 g of sodium and then 0.2 g of the sodium salt of bis-2-ethylhexylsulfosuccinate are added to the tert-amyl alcohol and the mixture is slowly heated to 95°–100° C. With efficient stirring, the metal is dissolved in the alcohol. The resultant solution is cooled to 90° C. and then 37.6 g of crude $\beta$-quinacridone pigment are added. The mixture is stirred for 3 hours at reflux temperature and a blue solution of the pigment salt in tert-amyl alcohol forms. The solution is cooled to room temperature, whereupon the pigment salt partially precipitates.

300 g of water are put into a 2500 ml glass flask and heated to reflux temperature. With efficient stirring, the suspension of the pigment salt is then added dropwise at 95° C. to the water while introducing steam and simultaneously distilling off the tert-amyl alcohol, whereupon the pigment salt is protolysed. The pigment suspension is stirred for 30 minutes at reflux temperature and filtered hot. The filter cake is washed with hot water until neutral and dried at 80° C. in a vacuum drying cabinet, affording a reddish violet quinacridone pigment which contains the $\beta$-modification as main component. When incorporated in TSA and AM varnishes, the pigment gives transparent and very strong reddish violet colourations of excellent weatherfastness.

EXAMPLE 15

The procedure of Example 14 is repeated, using dimethylformamide as solvent instead of tert-amyl alcohol. A quinacridone pigment of comparably good properties is obtained.

EXAMPLE 16

The procedure of Example 14 is repeated, using 37.6 g of $\gamma$-quinacridone instead of crude $\beta$-quinacridone to give 34 g of quinacridone pigment which contains the $\beta$-modification as main component in a very fine crystalline, high yield, fast pigment form.

EXAMPLE 17

A 750 ml glass flask is charged with 324 ml of tert-amyl alcohol and nitrogen is slowly blown in. 5.8 g of sodium and then 0.2 g of the sodium salt of bis-2-ethylhexylsulfosuccinate are added to the tert-amyl alcohol and the mixture is slowly heated to 95°–100° C. With efficient stirring, the metal is dissolved in the alcohol. The resultant solution is cooled to 90° C. and then 33.7 g of crude $\beta$-quinacridone pigment are added. The mixture is stirred for 2 hours at room temperature, whereupon the quinacridone as pigment salt dissolves to give a bluish violet solution. Then 4.2 g of 1,4-diketo-3,6-bis(4'-chlorophenyl)pyrrolo[3,4-c]pyrrole are added to the reaction mixture, which is stirred for 3 hours under reflux until the diketopyrrolopyrrole pigment has also been converted into the pigment salt. The mixture is then cooled to room temperature and the bulk of the pigment salts precipitates.

450 g of water are put into a 2500 ml glass flask and heated to reflux temperature. With efficient stirring, the suspension of the pigment salt is then added dropwise at 95° C. to the water while introducing steam and simultaneously distilling off the tert-amyl alcohol, whereupon the pigment salt is protolysed to the pigment.

The pigment suspension is stirred for 30 minutes and filtered hot. The filter cake is washed with hot water until neutral and dried at 80° C. in a vacuum drying cabinet and comminuted, affording 37 g of a red pigment powder which, when incorporated in plastics and varnishes, gives strong, transparent reddish violet colourations of excellent fastness properties.

EXAMPLE 18

A mixture of 130 g of steatite balls having a diameter of 8 mm, 47.5 g of alkyd/melamine stoving varnish consisting of 60 g of ®Beckosol 27-320 (Reichhold Chemie AG), 60% in xylene, 36 g of ®Super-Beckamin 13-501 (Reichhold Chemie AG), 50% in a 2:1 mixture of xylene/butanol, 2 g of xylene and 2 g of ethylene glycol monomethyl ether, and 2.5 g of the quinacridone pigment obtained in Example 11 are dispersed in a 200 ml glass flask with twist-off cap for 120 hours on a roller gear bed. After separating the glass balls, 2.4 g of the dispersed full shade mixture are mixed with 60 g of titanium dioxide ®Kronos RN 59 (Kronos Titan GmbH) and a further 24.0 g of the alkyd/melamine stoving varnish. The coloured varnish solution is sprayed onto aluminium sheets and subsequently stoved for 30 minutes at 130° C. to give bluish red finishes of excellent fastness properties.

EXAMPLE 19

A mixture of 1.0 g of the isoindoline pigment obtained in Example 1, 1.0 g of antioxidant (®IRGANOX 1010, ex Ciba-Geigy AG) and 1000 g of high density polyethylene granules (®Vestolen A 60-16, ex Chem. Werke Hüls) is stirred for 15 minutes in a glass flask on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in strong yellow shades of excellent fastness properties.

EXAMPLE 20

0.6 g of the pigment formulations obtained in Example 1 are mixed with 67 g of polyvinyl chloride, 33 g of dioctyl phthalate, 2 g of dibutyltin laurate and 2 g of titanium dioxide and the mixture is processed to a thin sheet on a roll mill for 15 minutes at 160° C. The PVC sheet so obtained is coloured in a very strong red shade which is fast to migration and light.

EXAMPLE 21

1000 g of polypropylene granules (®DAPLEN PT-55, ex Chemie Linz) and 20 g of a 50% pigment preparation consisting of 10 g of the product obtained in Example 2 and 10 g of magnesium behenate are thoroughly mixed in a mixing drum. The granules so obtained are melt spun at 260°–285° C. to red filaments of good light-fastness and textile fibre properties.

What is claimed is:

1. A process for the preparation of high yield pigments of the series of the diketopyrrolopyrroles, quinacridones, isoindolinones and isoindolines by protolysis of the pigment salt obtained by treating the crude pigment with a strong base or of the pigment salt obtained in the course of the synthesis, which process comprises treating said pigment salt, in an organic solvent, with water such that the organic solvent is simultaneously removed during the protolysis.

2. A process according to claim 1, wherein the pigments employed are diketopyrrolopyrrole pigments.

3. A process according to claim 1, wherein the pigments employed are quinacridone, isoindolinone or isoindoline pigments.

4. A process according to claim 1, wherein the pigments employed are mixtures of diketopyrrolopyrrole pigments with each other or with quinacridones or other pigments.

5. A process according to claim 1, wherein the solvent employed is a polar organic solvent.

6. A process according to claim 1, wherein the polar organic solvent is an alcohol.

7. A process according to claim 6, wherein tert-amyl alcohol is used as alcohol.

8. A process according to claim 1, wherein the protolysis is carried out in the temperature range from 15° to 100° C.

9. A process according to claim 1, wherein the solvent is removed by distillation during the protolysis.

* * * * *